United States Patent [19]

Maeda et al.

[11] Patent Number: 4,860,882

[45] Date of Patent: Aug. 29, 1989

[54] METHOD AND DEVICE FOR DISTRIBUTING AND FEEDING

[75] Inventors: Hiromu Maeda; Kazuo Haraguchi; Yasutsugu Ohbuchi, all of Shizuoka, Japan

[73] Assignee: Kabushiki Kaisha Maki Seisakusho, Japan

[21] Appl. No.: 246,949

[22] Filed: Sep. 16, 1988

Related U.S. Application Data

[63] Continuation of Ser. No. 804,373, Dec. 2, 1985, abandoned.

[30] Foreign Application Priority Data

Aug. 20, 1985 [JP] Japan .................................. 60-182647

[51] Int. Cl.⁴ .............................................. B65G 47/68
[52] U.S. Cl. .................................... 198/458; 198/442; 198/445; 198/688.1
[58] Field of Search ............... 198/365, 436, 445, 446, 198/453, 458, 692, 690.2, 688.1, 802, 442, 636; 209/539, 656

[56] References Cited

U.S. PATENT DOCUMENTS

| | | | |
|---|---|---|---|
| 1,817,037 | 8/1931 | Mattison | 198/699.1 X |
| 2,488,230 | 11/1949 | Page | 198/458 |
| 2,528,114 | 10/1950 | Cerruti | 198/458 |
| 3,147,844 | 9/1964 | Mountz | 198/458 |
| 3,190,432 | 6/1965 | Vanderhoof | 198/365 X |
| 3,767,027 | 10/1973 | Pund et al. | 198/458 X |
| 3,809,207 | 5/1974 | Euverard | 198/458 |
| 4,049,111 | 9/1977 | Mosterd | 198/445 |
| 4,129,207 | 12/1978 | Cupp | 198/458 X |
| 4,637,508 | 1/1987 | Kikuchi et al. | 198/365 |

FOREIGN PATENT DOCUMENTS 56-47147 11/1981 Japan .

Primary Examiner—Robert J. Spar
Assistant Examiner—Lyle K. Kimms
Attorney, Agent, or Firm—Wenderoth, Lind & Ponack

[57] ABSTRACT

Distributive feeding apparatus for separating a plurality of articles fed to a receiving part (12) to a plurality of separated lanes has a bar conveyor (11) comprising two chains (103) with bars (104) extending therebetween and carrier elements (105) slidably mounted on the bars (104). Guide rails (106) are provided below the carrying run of the conveyor and are engaged by lugs (1055) provided on each carrying element (105). During advancement of the conveyor with articles on the carrying surfaces (1051) of the elements (105), the elements (105) are gradually slid apart, guided by the rails (106), so that the elements are directed along each lane so as to feed carried articles in those lanes for further processing.

13 Claims, 9 Drawing Sheets

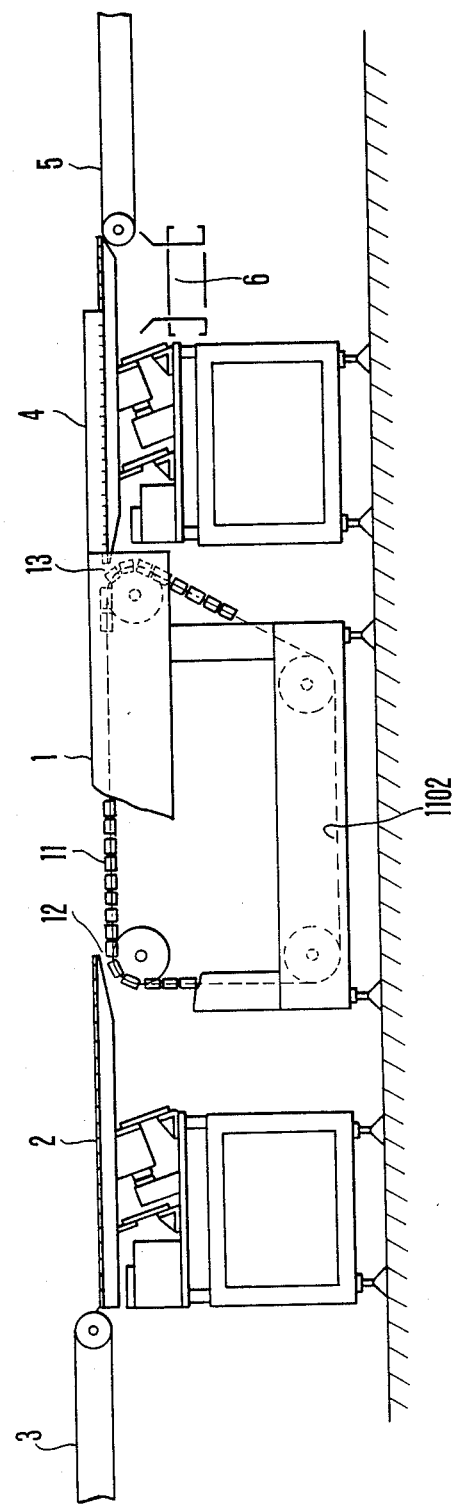

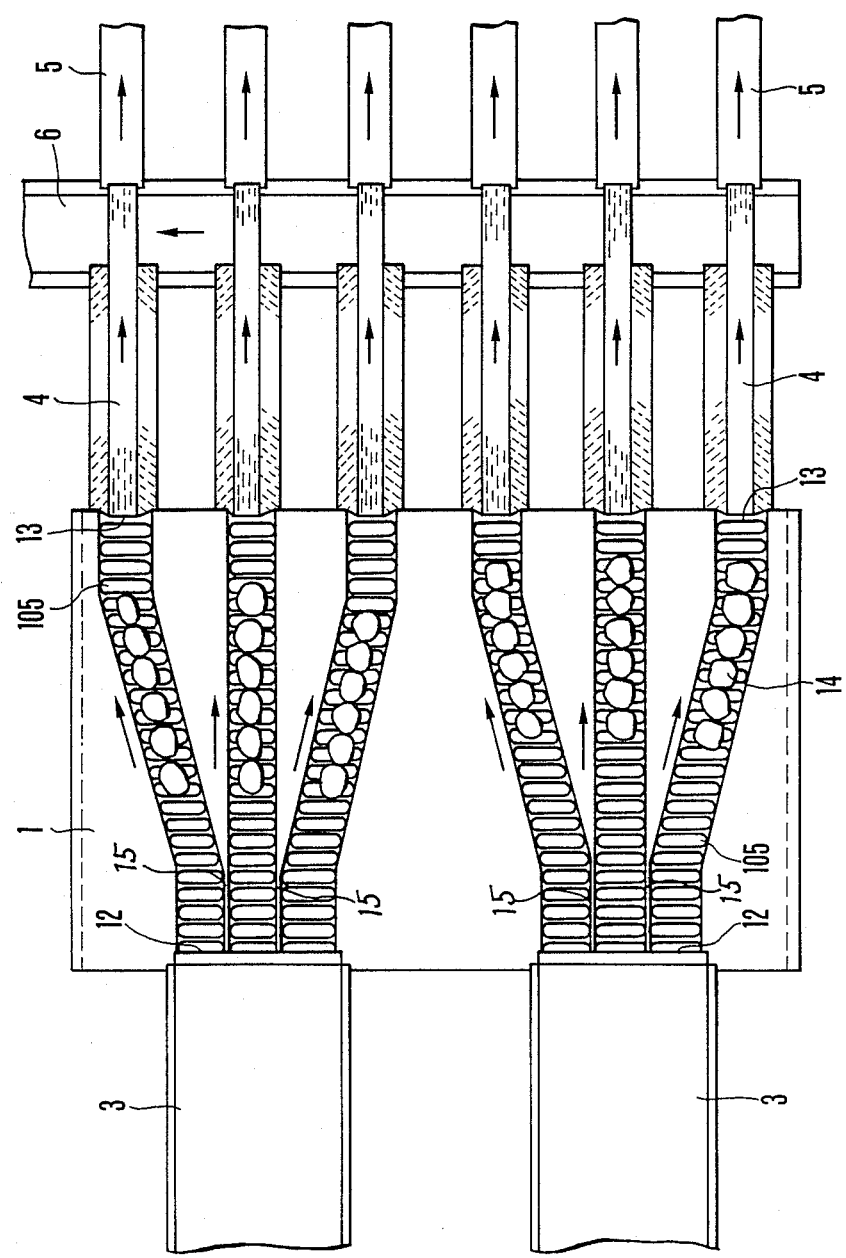

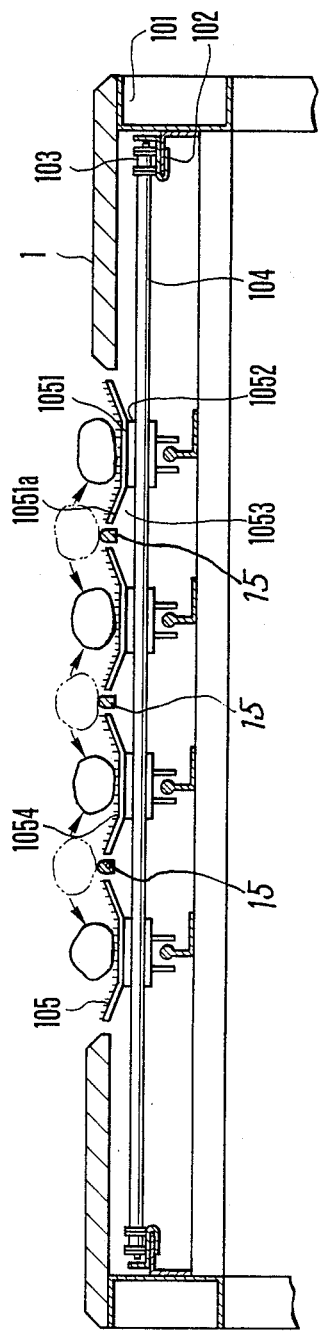
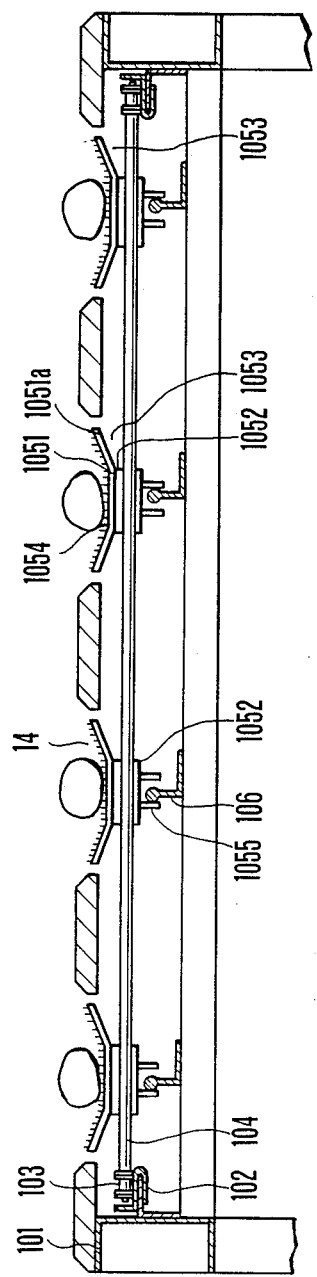

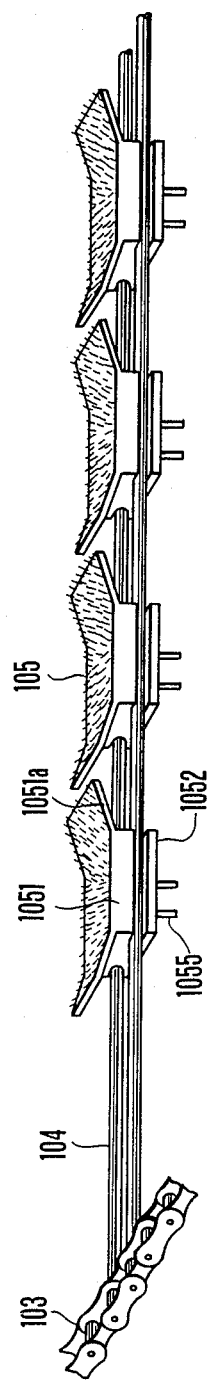
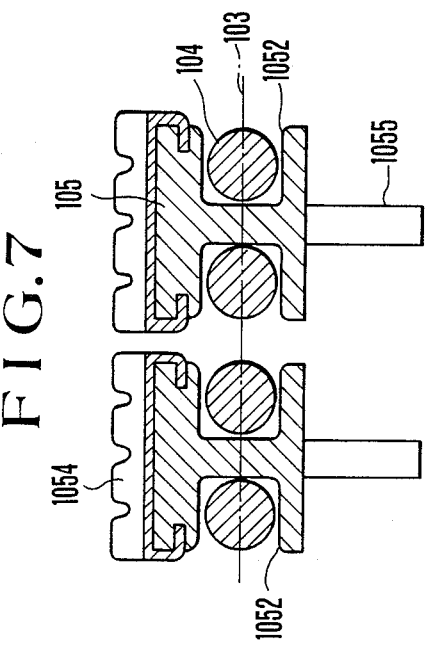
FIG.6
FIG.7

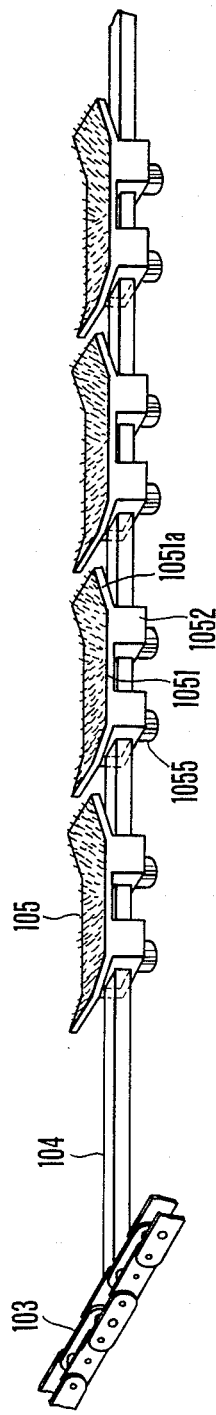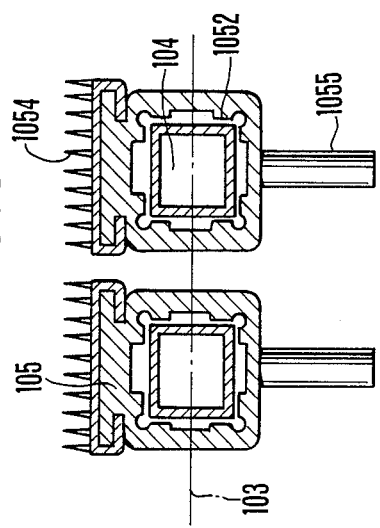
FIG. 8
FIG. 9

METHOD AND DEVICE FOR DISTRIBUTING AND FEEDING

This application is a continuation of now abandoned application Ser. No. 06/804,373, filed Dec. 2, 1985.

FIELD OF THE INVENTION AND RELATED ART STATEMENT

The present invention relates to a method of and apparatus for distributing and transferring articles evenly into a plurality of lanes.

A conventional apparatus, as disclosed for instance in Japanese Utility Model Publication No. 56-47147, for feeding articles supplied thereto from a preceding step or procedure into a number of lanes may be used for example in a sorting facility for fruits and vegetables. Such an apparatus has a feeding device using dispersing roller conveyors of a width which corresponds to the fruit sorting conveyors, so that the articles (fruits) being sorted are uniformly spread and supplied to all of the plurality leading to corresponding lanes of fruit sorting conveyors, which lanes are laid parallel to one another with regular spacings therebetween.

Such prior art apparatus as is described above is based on an expectation that articles roll in desired directions by virtue of the rolling characteristics of the articles themselves during the course of the transfer from an upstream location (preceding step) to a downstream location (connecting and transferring device). However, there is a shortcoming that the articles do not always properly roll in the expected directions because of variations in their shapes or external forms and their flow directions change at random. Therefore, when three or more lanes of fruit sorting conveyors are provided, articles cannot uniformly be distributed and fed to each lane: instead many articles tend to be transferred to a central region of a connecting and transferring device and only a small number of articles flow to the outer edges of the connecting and transferring device.

There is a further drawback that, depending upon the positions from which the articles are fed from a preceding step or the directions in which they are fed, an excessive number of articles tend to flow (or are transferred) to a connecting and transferring device at one of the sides in an overflowing manner, while few articles flow to the other side. There may thus be one or more conveyors along which excessive numbers of articles gather and flow, and other conveyors along which few articles flow.

As a result, when an excessive number of articles such as fruit flow, effective sorting and classification of the fruit on the sorting conveyor cannot be performed, and when few articles flow, even if sorting and classification can be performed, the processing efficiency (number sorted and classified) is low.

Also, such prior art apparatus as described above has the rollers of the roller conveyor rotate by themselves and such rotations carry out the conveyance function of the conveyor, which creates a drawback since the articles, such as fruit also rotate due to this rotation of the rollers, and scratches or bruises may be generated on the fruit by friction of the rotational contacts of the rollers and the fruit as well as by friction of the rotational contacts of fruit with other fruit, thus reducing the commercial value of the fruit.

OBJECT AND SUMMARY OF THE INVENTION

It is a principal object of this invention to provide a method of and apparatus for distributing articles which roll easily and are susceptible to scratches and bruises, such as fruits and vegetables, which method and apparatus can eliminate the above-described shortcomings of the prior art feeding apparatus, and which can transfer articles fed thereto from a preceding step to connecting and transferring devices which are provided downstream to feed a successive step having a number of lines with certain spacings therebetween. The apparatus aims at feeding the articles aligned in a row for each of the lines and with a near-uniform distribution, regardless of the way in which the articles are fed from the preceding operation, that is even if the articles are fed in an uneven manner or from different directions, etc., the apparatus further aims at conveying the articles in a stable manner without causing them to roll during the conveyance, thus preventing scratches or bruises to the articles due to rolling.

Accordingly, one aspect of this invention provides a method of distributively feeding articles which roll easily and are susceptible to scratches and bruises such as fruits and vegetables supplied from a previous operation to a receiving part in a random manner including irregular lateral spacings therebetween so as to spread out the articles into a plurality of lanes during transfer of the articles from a receiving part, characterised in that a plurality of carrier elements corresponding to the number of lanes into which the articles are to be sorted are provided and each carrier element has both end portions slanting upwardly and laterally toward their respective free ends, and the upper surface has a number of relatively soft resilient protrusions thereon, and the carrier elements are assembled on individual bars of a bar conveyor having a width corresponding to the lateral extent over which the articles are to be sorted, positioning the plurality of carrier elements close together at the receiving part, and providing narrow sorting partitions between the adjacent carrier elements at the receiving part, and then during advancement of the conveyor sliding the carrier elements by means of guide rails into separate lanes arranged in predetermined directions, the carrier elements thus being gradually spread out so that the articles are evenly distributed and conveyed without rolling of the articles during the conveyance, thus supplying them to a connecting and transferring device provided at a downstream end of the bar conveyor.

According to a second aspect of this invention, there is provided a distributive feeding apparatus for feeding articles which have been supplied from a previous operation to a receiving part and which roll easily and which are susceptible to scratches and bruises, such as fruits and vegetables, into a plurality of separate lanes in a random manner, including irregular lateral spacing therebetween. This apparatus is characterised by the provision of a bar conveyor mechanism having a plurality of carrier elements mounted on the bars thereof for lateral sliding movement with respect to the direction of advancement of the conveyor mechanism, each one of the carrier elements having both end portions slanting upwardly and laterally toward their respective free ends, and the upper surface having a number of relatively soft resilient protrusions thereon there being a like number of carrier elements across the width of the conveyor mechanism as there are lanes into which the articles are to be distributed, there being narrow sorting partitions extending in the direction of advancement of the conveyor between the laterally adjacent carrier elements at the receiving part, and the conveyor mechanism having a sufficient total width as is necessary for the elements to be able to feed those lanes, the apparatus further being characterised by the provision of a like number of guide rails one associated with each lane of carrier elements and arranged to cause the carrier elements to slide transversely with respect to the conveyor mechanism as the elements are advanced, whereby articles are supplied to the input end to the receiving part of the apparatus with irregular lateral spacings therebetween, and even articles which encounter a side portion of the carrier element or articles which are moved onto the above-mentioned sorting partitions are gently directed to a central part of an adjacent carrier element, whereby the articles are carried by the carrier elements in a stable manner and without rolling, into a plurality of separate lanes for transfer by a connecting and transfer device for each lane at the downstream end of the apparatus.

In the present invention, articles supplied from a preceding step in a random manner are spread out into a plurality of lanes while being transferred from an input end to an outlet end. The articles can be fed in an almost uniform manner to a transferring device provided at the downstream end in a plurality of lanes arranged parallel to one another and with prescribed intervals therebetween.

The bar conveyor may be formed by asesmbling bars between lateral endless chains which run in a recirculating manner, the length of the bars being equal to the width of the conveyor. Across the width of the conveyor are mounted as many carrier elements as there are lanes of the transferring device at a downstream end and to which articles are to be fed (for example, 4 carrying elements when the downstream end is connected to a 4 lane transferring device). The carrier elements are transversely slidable (in the width direction), so that a plurality of lanes for the articles are formed on the bar conveyor.

The paths along which the carrier elements move are defined in the transverse direction by guide rails provided within the apparatus. These paths are arranged gradually to spread out as the carrier elements are advanced by the conveyor, by sliding movement of the elements, the carrying path for each element curving easily towards a prescribed position.

In a case where articles are fed from a preceding step to a plurality of locations on the receiving part of the apparatus, each carrier element of the bar conveyor may be made to correspond in position to each receiving part location by the guide rails provided within the device, the carrier elements being spread out from each receiving part location towards the prescribed positions at the downstream end of the apparatus.

When the width over which the apparatus of the present invention is to distribute articles is relatively large, at least two parallel lanes of bar conveyors may be combined within the apparatus. This may be necessary because the width of a bar is limited so that the bar will not bend under load, for a given bar size. When articles are to be distributed over a greater width than that length, more than one bar conveyor may be arranged side-by-side within a frame of the apparatus, without the need to have an upstanding frame portion which might interfere with the carrying of articles.

Preferably, two bar conveyor sets are arranged in a co-axial manner side-by-side within the apparatus frame.

By arranging for there to be no obstacles in the path of the bars and chains between the two bar conveyor sets with the above-mentioned arrangement, a receiving part from a preceding step may extend over the boundary between the two bar conveyors.

Each carrier element preferably has a central part for slidable mounting on the bar conveyor and an article-carrying surface which extends transversely to both sides of the central part, thus forming a carrying area of a greater width than that of the sliding part. In this way, a space may be provided between the lower side parts of the carrying area and the associated bar; this permits outer carrying elements to be slid to extreme positions on the bar where the bar end and chain are located beneath part of the carrying area.

It is further preferred for the side parts of the carrying surface of each carrier element to be directed The side parts of the carrying surface of each carrier element are so formed as to be bent to be carried in the central region.

Each bar of the bar conveyor may be a round rod or pipe, but for such a case each carrying element should be mounted for sliding movement on two adjacent bars, to maintain the required position of the element. Alternatively, each bar may be of square section or other profiled shape, so that a carrier element can be mounted on one bar and still be prevented from rotating therearound; this case is the more preferred.

Each guide rail may be disposed below the carrying path along which the carrier elements are moved, each carrier element having a protruding lug which engages with the associated guide rail. For example, the lug may be formed as two legs between which the rail passes, so that the guide rail directly defines the carrying path. Therefore the guide rail for spreading out the carrier elements while sliding the same in a prescribed direction can be formed with one simple rail curved in a prescribed manner.

In an alternative arrangement, only one leg projects from each carrier element, the guide rail then having a different shape. In this case, both sides of the protruding leg must be guided to cause the element to slide in the prescribed manner, and so the guide rail may be formed to have a groove along which the protruding leg easily may pass, or may be formed with two rail portions.

BRIEF EXPLANATION OF THE DRAWINGS

FIG. 2 is a side elevation of the apparatus of FIG. 1;

FIG. 3 is a plan view of the apparatus, being fed with articles by two separate conveyors;

FIG. 4 is a cross-sectional view of the apparatus, htaken on line A—A marked on FIG. 1;

FIG. 5 is a further cross-sectional view of the apparatus, taken on line B—B marked on FIG. 1;

FIG. 6 is an oblique view of part of a bar conveyor using round bars;

FIG. 7 is a cross-sectional view of two carrier elements shown in FIG. 6;

FIG. 8 is an oblique view of part of an alternative bar conveyor, using a square-shaped bar;

FIG. 9 is a cross-sectional view of two carrier elements shown in FIG. 8;

DETAILED DESCRIPTION OF THE INVENTION

By way of example only, certain specific embodiments of apparatus constructed in accordance with this invention and arranged to operate in accordance with a method thereof will now be described in detail, reference being made to the accompanying drawings.

Figure 1:
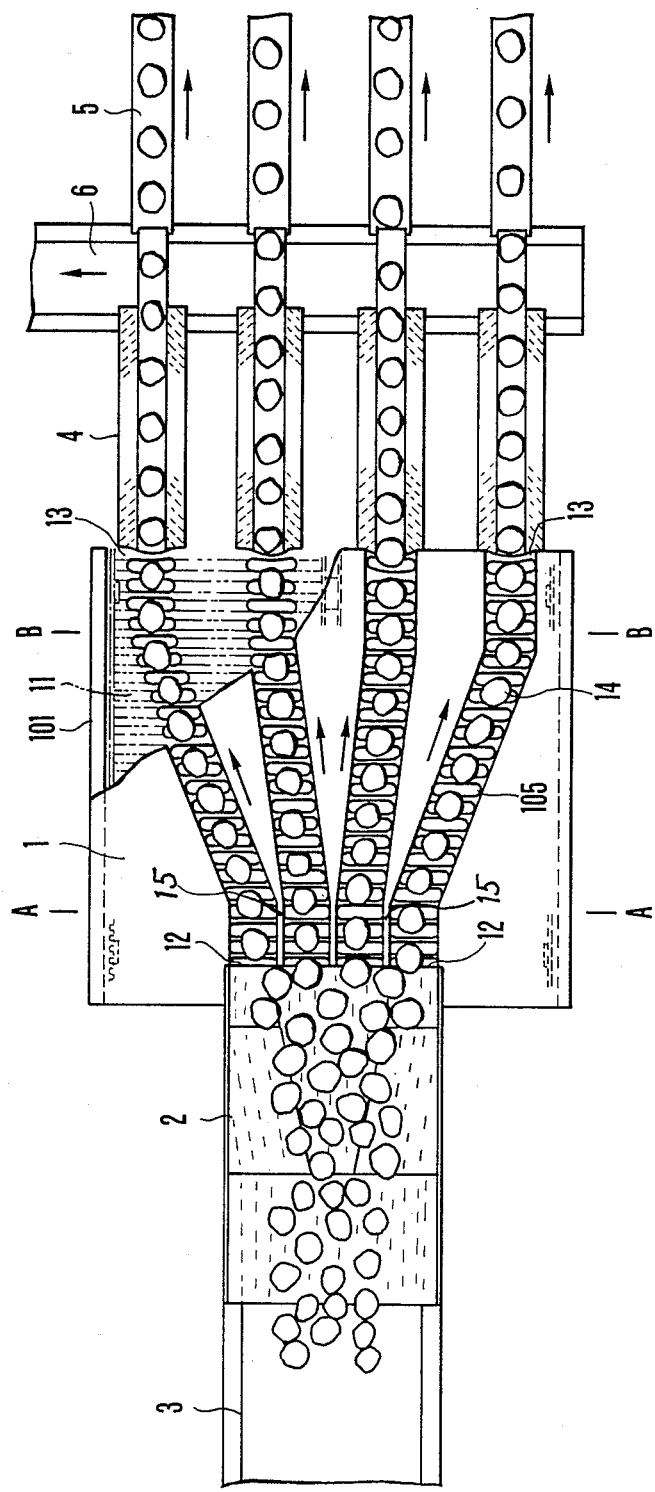
FIG. 1 is a plan of the first embodiment, as a whole.

Referring to FIG. 1, there is shown a distributive feeding apparatus 1 according to the present invention for handling articles which roll easily and are susceptible to scratches and bruises, such as fruits and vegetables, a supply feeder 2 and a supply conveyor 3 being connected to inlet end 12 (upstream end) of the apparatus having a receiving part. One aligning device 4 and transfer conveyor 5 are connected to outlet end 13 (downstream end) of the apparatus for each sorting lane (in this case, four such lanes are provided), the transfer conveyor 5 being connected to a sorting and classification conveyor (not shown). An overflow conveyor 6 is arranged to receive articles from the aligning devices 4 in the event that excessive numbers of articles are fed to a particular aligning device due to excessive feeding by the apparatus 1.

The inlet end 12 of the distributive feeding apparatus 1 may be directly connected to the supply conveyor 3, omitting the supply feeder 2. A supply feeder 2 may however be used in a case where the width of the supply conveyor 3 is small as compared to the width of the inlet end of the apparatus 2, the width of that inlet end being determined by the number of lanes to which articles are to be distributed by the distributive feeding apparatus 1. A supply feeder may also be used in the alternative case, where the width of the supply conveyor is large as compared to the width of the feeder 2. Moreover, for a case where articles may be carried in heaps on the supply conveyor 3, a feeder 2 may be used so as suitably to disperse and feed the articles on to the inlet end 12 of the distributive feeding apparatus 1. When the receiving width of the inlet end 12 and the width of the supply conveyor 3 are equal and articles are fed on the supply conveyor 3 in a randomly spaced manner, the supply feeder 2 may be omitted, as shown in FIG. 3.

A narrow sorting partition 15, which has a small width and extends in the direction of advance of the conveyor is provided between laterally adjacent carrier elements 105 at the inlet end 12 of the conveyor adjacent the receiving part. The top edge of this sorting partition 15 is slightly above the free ends of the slanted end portions of the carrier elements, and causes the articles to roll gently onto a central portion of either the left or right carrier element 105 when the articles, which have been supplied from a previous operation with irregular spacings therebetween, are fed onto the sorting partition 15, and at the same time it provides a partition for an adjacent lane and may be spread out and extended not only at the receiving part but also from the receiving part in the direction of advance along the conveyor to a downstream end 13. The top edge of the partitions 15 is preferably rounded to ensure guiding an article which is not aligned with a carrier element 105 onto one or the other of the adjacent carrier elements.

The supply feeder 2, as shown, is preferably a vibration-type feeder, on the surface of which are arranged resilient protrusions projecting upwardly and tilted in a desired direction in which the articles are conveyed toward the inlet end 12 of the receiving part in a random manner, including irregular lateral spacings therebetween. The protrusions may be made of a synthetic resin such as soft PVC or an elastomer.

The distributive feeding apparatus 1 has a frame 101 the width of which is determined by the number of lanes to which the articles are to be distributed at the downstream end 13 and by the spacing between those lanes. Endless conveyor chains 103 run in a spaced-apart parallel manner along chain rails 102 provided within the frame 101, bars 104 being assembled to extend between the chains 103 so as to form a bar conveyor 11.

Mounted on the bars 104 are carrier elements 105, there being an appropriate number of such carrier elements mounted across the width of the bar conveyor as are necessary for the number of lanes supplied by the apparatus 1, these elements 105 being freely slidable in the transverse direction.

Each bar 104 may have a solid round cross-section, a hollow square cross-section, or may have any other suitable cross-sectional shape. When a bar 104 of round cross-sectional shape is used, each carrier element 105 should be mounted on a plurality of the bars so as to be freely slidable transversely but so as to be held against rotation with respect to a bar, as shown in FIGS. 6 and 7. Thus, the posture of each carrier element 105 is kept constant.

When the cross-sectional shape of a bar 104 is not round but is a square or has some other profiled shape, each carrier element 105 may be mounted on a single bar so as to be freely slidable transversely, as shown in FIGS. 8 and 9. Since each carrier element 105 is arranged closely to surround the bar, the element is held against rotation with respect to the bar 104, and so again the posture of each carrier element 105 can be maintained in a predetermined disposition by the bar.

Each carrier element 105 has an upper surface 1051 on which an article to be carried is placed, which surface has wing parts 1051a extending to both sides from an upper central sliding part 1052, as shown in FIG. 5. In this way, a carrier surface 14 is formed with a greater width than that of the sliding part 1052. Both wing parts 1051a are so formed as to provide a space 1053 between the respective bar 104 and the adjacent wing part; this permits an element to be slid to a position where the end of the bar 104 and the associated conveyor chain 103 are positioned below the wing in the space 1053.

Figure 10:
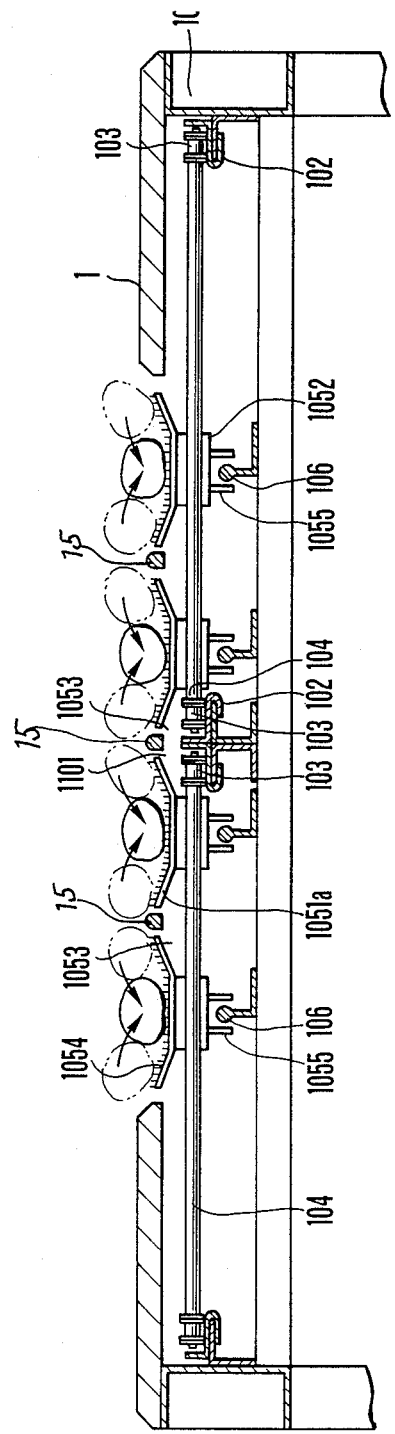
FIG. 10 is a cross-sectional view through the inlet end of the apparatus, using two sets of bar conveyors.
Figure 11:
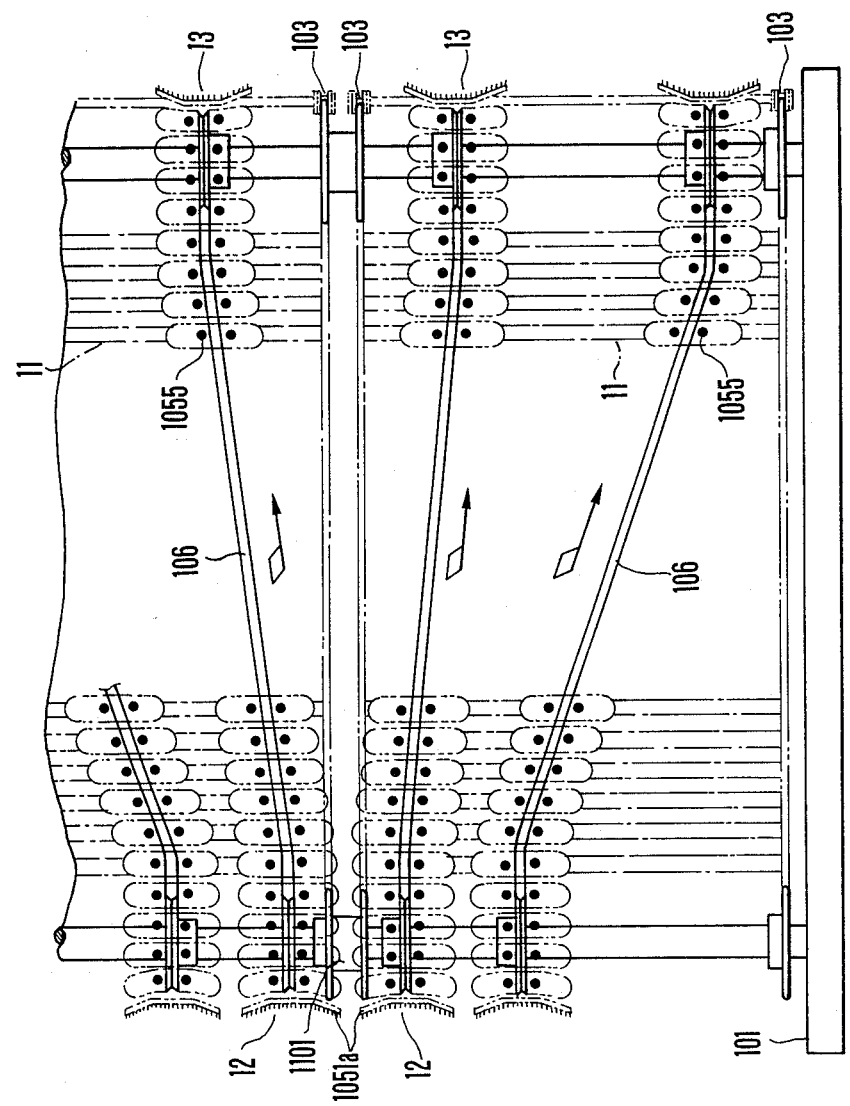
FIG. 11 is a schematic view of guide rails using two sets of bar conveyors.
Figure 12:
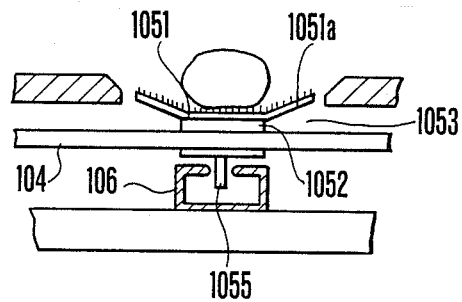
FIGS. 12 and 13 respectively show cross-sectional views of parts of other embodiments of carrier elements and guide rail assemblies.
Figure 13:
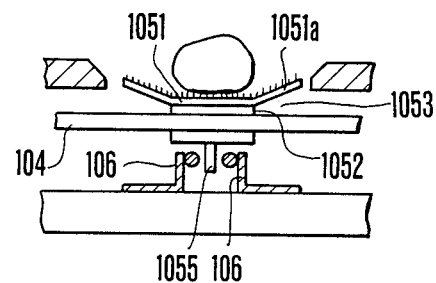

Since the length of each bar 104 of the bar conveyor 11 is limited, depending on the cross-section thereof, when the width of the apparatus is to be particularly large, and thus greater than the permissible length of each bar 104, two or more bar conveyors 11 may be arranged in parallel within the frame 101, as shown in FIGS. 10 and 11. In this way, a plurality of bar conveyor lanes may be provided. In such an arrangement, the inner boundary 1101 between the two bar conveyors is covered by the wings 1051a of the carrier elements 105 on adjacent conveyors when those elements are slid to their central positions. The supply feeder 2 of a preceding step or operation, or the receiving part from a supply conveyor 3, that is, the inlet end 12, can thus still feed in the region of this boundary 1101.

The upper surface 1051 of each carrier element 105 is preferably formed so that both wings 1051a are directed upwardly towards their free edges, in the transverse direction, so that the upper surface 1051 is somewhat concavely shaped. A carrier article will thus be guided towards the central region of a carrier element.

Also, it is preferred for the upper surface 1051 to have resilient protrusions 1054 projecting upwardly, each such protrusion having for example a needle shape, a bar shape or the like. The protrusions 1054 may be made of a synthetic resin such as soft PVC of an elastomer, and the upper surface 1051 may thus resemble a brush with upright bristles. The upstanding hair or bristle-like protrusions 1054 have a rolling-preventing function, so that an article which may easily roll on a flat surface will gently be restrained from rolling while being conveyed.

Each carrier element 105 has a lug 1055 which projects downwardly from sliding part 1052, beyond the associated bar 104 to a position below the conveyor 11. Each lug preferably has two projecting parts with a lateral gap therebetween, as shown in FIGS. 4 and 5, so that a guide rail 106 may pass therebetween. Each carrier element 105 will thus be guided to a predetermined position by the guide rail. An alternative arrangement would be to have a lug 1055 with only one projecting part, the guide rail 106 being configured for co-operation with the single projecting part. In this case, two guide rails or a guide rail having a grooved shape may be used with the single projecting part being located therebetween or in the groove.

The lugs 1055 may be formed by attaching suitable members to the carrier elements 105, or may be formed integrally with the sliding part 1052 of the carrier element 105.

When the conveyor 11 is advanced, the projecting parts of the lugs 1055 cause the carrier elements to follow the lines to the guide rails provided beneath the conveyor path, the carrier elements sliding laterally along the bars 104, as necessary. The guide rails 106 thus define the routes of the carrying paths for the articles by the carrying elements, and each guide rail is so formed as to define a curving path connecting the inlet end 12 to the aligning device 4 at the downstream end 13 or to the position of the transfer conveyor 5.

In this way, the article carrying paths fan out divergently from the inlet end 12 at which articles are supplied from a preceding step towards the downstream end 13; each carrier element of each lane thus is moved in a sliding fashion towards a predetermined position, following a desired article carrying path.

The carrier elements 105, following their separation into respective lanes at the downstream end 13 as mentioned above, are slid back together again by return guide rails (not shown) during the return run 1102 of the bar conveyor 11, so as to be returned to their starting positions at the inlet end 12. The articles are supplied from the previous operation in a random manner including irregular lateral spacings there-between, and even articles which are caused to move onto both wing parts 1051a of the carrier elements 105 and articles which move onto the above-described sorting partitions 15 are gently guided to central parts of the carrier elements 105 and are placed in a stable state at the inlet end 12 of the receiving part in the apparatus 1, and then the articles are uniformly supplied to a plurality of lanes of carrying elements mounted on bar conveyors; and then as the bar conveyors are advanced, the paths of each lane of article-carrying elements diverge so that the distance between each lane is gradually increased. The paths curve easily towards a prescribed position, whereat the articles are transferred in a stable manner without rolling on the carrier elements to a device of a next step connected to the apparatus at the downstream end thereof.

Tests made by the Applicants have demonstrated that when the bar conveyors arranged as described above are operated in the reverse direction, the apparatus may serve as s confluence conveyor device, serving the opposite function of a distributive feeding device.

It will be appreciated that various parts of the apparatus as described above can be modified but the apparatus still will fall within the ambit of the present invention; the above description and the accompanying drawings concern only certain specific embodiments of the invention. For example, different arrangements for the bar conveyor, different shapes of the carrier elements and different guide rail structures, as well as different arrangements for the carrying lanes, all may fall within the scope of this invention.

When the described apparatus is in operation, articles supplied to the receiving part in a random manner including irregular lateral spacings therebetween, and even when the articles are fed between the carrier elements they are easily guided to a central part of a carrier element, and are thus stabilized by the sorting partition and the slanting of the two end portions of the carrier elements, and the articles are carried by the elements along paths which gradually diverge into a plurality of lanes. The articles are not subjected to external forces and so are unlikely to be damaged, for instance by being rolled or from frictional contact. Instead, the articles are smoothly transferred distributively from the inlet end to the outlet end. As a result, articles such as soft fruits—which are very susceptible to damage during a transfer stage—can be distributively fed without being damaged.

Articles supplied to the receiving part are guided to a central part of the carrier element not only when they are supplied in line with the carrier elements at the inlet end but also when they are supplied along a line between the carrier elements, that is onto the upper edges of the sorting partitions. The carrying surfaces of the elements with the articles thereon follow divergent paths as they are and therefore the articles are uniformly spread out with no unevenness amongst the lanes. The capacity of an apparatus at the next processing stage and connected to the downstream end may efficiently be utilized; thus when the apparatus of this invention is used in a fruit sorting facility, the processing capacity thereof can be improved.

We claim:

1. A method of distributively feeding articles which roll easily and which are susceptible to scratches and bruises, such as fruits and vegetables, and which have been supplied from a preceding operation to a receiving part, by diverging the articles into a plurality of lanes while transporting the articles from the receiving part, characterized in that a plurality of carrier elements corresponding to the number of lanes into which the articles are to be distributed are assembled on individual bars of a bar conveyor having a width corresponding to the lateral extent over which the articles are to be sorted, each carrier element having a carrying area having portions on the opposite lateral ends extending in the width direction of the bar conveyor which slant upwardly and the carrying element having on the carrying area a plurality of relatively soft resilient protrusions capable of bending under the weight of the article being carried, positioning the plurality of carrier elements close together at the receiving parts, providing narrow sorting partitions in the spaces between the opposed lateral end portions of adjacent carrier elements for causing articles on the receiving part which are not aligned with a carrier element to be gently rolled onto a carrier element, and then during advancement of the conveyor, sliding the carrier elements by means of guide rails into separated lanes arranged in predetermined directions, the carrier elements thus being gradually spread out so that the articles are evenly distributed for supply to a connecting and transferring device provided at a downstream end of the bar conveyor.

2. A method according to claim 1, characterised in that the receiving part is provided with at least two supply locations and the plurality of carrier elements are arranged in a number of groups each corresponding to the size of a receiving part location, the elements of each group being positioned close to each other at the respective receiving part location and being individually slid into each lane as the conveyor is advanced.

3. A method according to claim 1, wherein said receiving part is provided at a single supply location.

4. A distributive feeding apparatus for distributively feeding articles which roll easily and which are susceptible to scratches and bruises, such as fruits and vegetables, which have been supplied from a previous operation by diverging the articles into a plurality of separate lanes which are spaced laterally from each other in the direction of transporting the articles, comprising:
  an input end and a downstream end;
  a receiving part at said input end for receiving articles from the previous operation in a random manner which includes uneven lateral spacing;
  a bar conveyor mechanism extending from and movable in a direction from said receiving part to said downstream end, and having a plurality of carrier elements mounted on the bars thereof for lateral sliding movement with respect to the direction of advancement of said conveyor mechanism, each carrier element having a carrying area having portions on the opposite lateral ends extending in the width direction of the conveyor which slant upwardly and the carrying area having on the upper surface a plurality of relatively soft resilient protrusions, there being the same number of carrier elements across the width of said conveyor mechanism as there are lanes into which the articles are to be distributed and said conveyor mechanism having a width sufficient for accommodating said plurality of carrier elements spaced corresponding to the spacing of said lanes so as to be able to feed articles into said lanes;
  a plurality of narrow sorting partitions, one in the space between the opposed lateral end portions of each pair of adjacent carrier elements for causing articles on the receiving part which are not aligned with a carrier element to be gently rolled onto an adjacent carrier element; and
  a plurality of guide rail means, one coresponding to each lane, and engaged with a corresponding one of said carrier elements for causing said carrier elements to slide transversely with respect to the direction of advancement of said conveyor mechanism as said carrier elements are advanced on said bar conveyor to bring said carrier elements into alignment with corresponding lanes, whereby articles fed to the input end of the apparatus are carried by said carrier elements into the plurality of separate lanes for transfer to a connecting and transfer device for each lane at the downstream end of the apparatus.

5. An apparatus as claimed in claim 4 wherein said input end has at least two separate article receiving parts and said carrier elements and guide rails are divided into at least two groups, one of each receiving part, and said carrier elements of each group diverging as said conveyor mechanism advances so that at the downstream end of the apparatus all of said carrier elements of both groups are separated.

6. An apparatus as claimed in claim 4 or 5 in which said bar conveyor mechanism comprises at least two separate bar conveyors mounted in side-by-side parallel relationship and each having a plurality of carrier elements side-by-side on the bars of each conveyor.

7. An apparatus as claimed in claim 4 in which the receiving part of the apparatus extends across the boundary region between adjacent carrier elements immediately downstream of the receiving part.

8. An apparatus as claimed in claim 4 or 5 in which each bar of said bar conveyor mechanism comprises two members having a round cross section, and each carrier element is provided with grooves in which said two members are engagable at the front and rear portions of said carrier element with respect to the running direction of said conveyor mechanism for causing said carrier element to slide along the length of said bar without rotating around said bar.

9. An apparatus as claimed in claim 4 or 5 in which each bar of said bar conveyor mechanism has a cross-sectional shape other than round, and each carrier element has an aperture in which a bar is closely received and having a cross sectional shape for permitting said carrier element to slide along the length of said bar but not rotate therearound.

10. An apparatus as claimed in claim 4 or 5, in which the spacing between the positions of said carrier elements in the lanes at the downstream end of the apparatus is uniform.

11. An apparatus as claimed in claim 4 or 5, in which said guide rail means for each lane is provided below the carrying run of said conveyor mechanism, and each carrier element has projection means extending below the carrying run and engaging the associate guide rail means.

12. An apparatus as claimed in claim 11 in which said projection means has two spaced legs and said guide rail means is a single guide rail.

13. An apparatus as claimed in claim 11 in which said projection means is a single leg, and said guide rail means is a pair of guide rail portions between which said leg is guided.

* * * * *